United States Patent [19]
Sasaki et al.

[11] Patent Number: 5,540,746
[45] Date of Patent: Jul. 30, 1996

[54] GLASS FORMING APPARATUS

[75] Inventors: Takuya Sasaki; Shuhei Maeda, both of Kanagawa-ken, Japan

[73] Assignee: Sumitomo Heavy Industries, Ltd., Japan

[21] Appl. No.: 337,459

[22] Filed: Nov. 4, 1994

Related U.S. Application Data

[63] Continuation of Ser. No. 946,563, Sep. 18, 1992, abandoned.

[30]     Foreign Application Priority Data

Oct. 9, 1991 [JP] Japan ................................. 3-260929

[51] Int. Cl.⁶ .................................................. C03B 23/04
[52] U.S. Cl. ........................ 65/275; 65/103; 65/122; 65/183; 65/355; 65/356
[58] Field of Search ............................. 65/63, 66, 83, 65/103, 122, 183, 292, 269, 275, 276, 327, 355, 356; 425/550, 547–549, 564, 566

[56]              References Cited

U.S. PATENT DOCUMENTS

| 2,495,956 | 1/1950 | Cook | 65/162 |
|---|---|---|---|
| 3,467,513 | 9/1969 | Dockerty | 65/183 |
| 4,046,540 | 9/1977 | Lewis et al. | 65/66 |
| 4,199,343 | 4/1980 | Eolin et al. | 65/183 |
| 4,451,116 | 5/1984 | Pinnow et al. | 350/96.4 |
| 4,695,240 | 9/1987 | Li et al. | 425/550 |
| 4,728,351 | 3/1988 | Meerman | 65/18.1 |

FOREIGN PATENT DOCUMENTS

| 3306253 | 1/1983 | Germany . | |
| 4981419 | 8/1974 | Japan . | |
| 249723 | 10/1987 | Japan | 425/550 |
| 1203234 | 8/1989 | Japan . | |
| 1249630 | 10/1989 | Japan . | |
| A182419 | 11/1922 | United Kingdom . | |

*Primary Examiner*—Donald E. Czaja
*Assistant Examiner*—Sean Vincent
*Attorney, Agent, or Firm*—Lorusso & Loud

[57]              ABSTRACT

A glass rod used as a molding material is inserted into a cylinder, pressed and heated with a temperature gradient in which the tip side of the glass rod is at a higher temperature. The glass rod is melted on the tip side thereof, and it is solidified on the rear side in the vicinity of the inlet of the cylinder, the solid portion functioning as a plunger when the rear side is pushed. When the glass rod is forwardly moved, the molten glass on the tip side is injected from an injection nozzle and is filled in the cavity of a forming mold. Since the glass rod itself is made of a molding material and functions as a plunger, when the tip side is melted and consumed, the solid portion on the rear side is forwardly moved and melted. It is thus possible to perform continuous mold forming without complicating the mechanism and steps and to improve the quality of the molded product.

11 Claims, 5 Drawing Sheets

GLASS FORMING APPARATUS

This application is a continuation of application Ser. No. 07/946,563, filed Sep. 18, 1992, now abandoned.

BACKGROUND OF THE INVENTION

The present invention relates to a glass forming apparatus and method.

When a glass optical element, e.g., a glass lens, is formed, a forming method is generally employed in which a glass lump is ground and polished to form a desired final shape.

However, since this forming method comprises the complicated steps of grinding and polishing and requires much time for the steps, the cost is increased. Particularly, when an aspherical lens which has been greatly in demand in recent years is formed, the work becomes difficult because the steps are further complicated, and it is necessary for a skilled worker to finish the product in a final step.

On the other hand, a forming method which enables the omission of the final finishing step has been proposed.

For example, in a reheat press method, a preform (a glass preformed product) having a predetermined shape and mass is previously formed by grinding and is pressed with heating at a high temperature in a forming mold having high-precision surfaces. This method is capable of directly forming a glass lens having a desired shape.

However, in order to attain surface accuracy and dimensional precision which are required of a glass lens as a final product, it is necessary to sufficiently adjust the weight of the preform and to sufficiently finish the surfaces in the step of grinding and the like. This makes the work of forming the preform troublesome and increases the cost.

A direct press method of directly pressing molten glass without forming a preform has thus been proposed.

In this case, a glass flow is formed by the molten glass caused flow out or pushed out from an outflow orifice, is cut in a required amount by a cutting edge and is filled in a forming mold. In this case, the forming mold comprises a pair of left and right or upper and lower parts so that softened glass is directly held between the parts of the forming mold and pressed (Japanese Patent Laid-Open No. Hei 1-203234).

The direct press method generally uses a pair of cutting edges for cutting the glass flow. In this case, if the glass does not have proper viscosity ($10^3$ to $10^5$ poise) a sound product can not be easily formed. Namely, for example, when the viscosity is high, a nonuniform cutting mark occurs at the front end and rear end of the cut glass flow and remains as a defect in a formed product. Conversely, when the viscosity is low, the glass flow cannot be easily cut, and defects such as bubbles, striae or the like easily occur.

Although various techniques of cutting and supplying a glass flow are proposed for solving the above problems, satisfactory results are not always obtained.

In addition, it is necessary for obtaining good forms by the direct press method to hold and press molten glass maintaining proper viscosity ($10^3$ to $10^5$ poise) in the forming mold.

Although it is thus necessary to press the forming mold with high precision while controlling it in an appropriate high-temperature state, it is very difficult to control such a forming mold having a complicated mechanism in an appropriate high-temperature state. Further, since glass is excessively supplied to the forming mold, excess glass is extruded from the forming mold. A mechanism for removing the extruded glass is thus necessary, thereby further complicating the structure of the forming mold.

A forming method is thus proposed in which glass is filled in the cavity of a forming mold under pressure instead of pressing by moving the forming mold (Japanese Patent Laid-Open No. 49-81419 and 1-249630).

In this case, molten glass is filled in the cavity of the forming mold under pressure, and pressing is continued until the glass is solidified in order to prevent a shrink mark from occurring by shrinkage during solidification of the glass.

However, in this forming method, since the molten glass is supplied to the forming mold by sliding a plunger in a cylinder which is filled with the molten glass, the plunger and the cylinder are eroded by the glass, and abrasion or galling thus occurs thus making it difficult to stably supply the glass for a long time.

In the forming method disclosed in the Japanese Patent Laid-Open No. 49-81419, since a glass lump as a raw material must be inserted into a transfer chamber for each forming step, forming cannot be continuously performed, with reduction in efficiency.

In the forming method disclosed in the Japanese Laid-Open Application No. 1-249630, although forming can be continuously performed, the heat resistant structure and the temperature control of the overall forming apparatus are significantly complicated because the molten glass in a molten glass bath is supplied to the cylinder through a supply tube and injected by the plunger. In addition, since the raw material glass is held in a high-temperature melt state for a long time, the glass becomes heterogeneous in quality, and impurities are easily mixed therein.

In all the above methods, the complicated mechanism and steps increase the cost, and the quality of the formed product cannot be improved.

SUMMARY OF THE INVENTION

It is an object of the present invention to solve the problems of the conventional glass forming apparatuses and forming methods and to provide a glass forming apparatus and method which are capable of continuously forming molten glass by a mold forming method without complicating the mechanism or steps and which is capable of improving the quality of the formed product.

In order to achieve the above object, in the present invention, a glass rod made of glass used as a molding material is inserted into a heating cylinder and pressed by a glass rod pressing device disposed at the rear end of the glass rod.

Heating means is provided on the heating cylinder so as to heat the glass rod with a temperature gradient in which the front end of the glass rod is at a higher temperature. The glass rod is thus melted at the front end, and it is solidified in the vicinity of the inlet of the heating cylinder.

When the glass rod is forwardly moved, the molten glass on the front end side is injected from an injection nozzle disposed at the tip of the heating cylinder and filled in the cavity of a forming mold disposed in front of the injection nozzle.

Since the glass rod itself is made of molding material, and the rear end side of the glass rod is solidified and thus functions as a plunger, when the solidified portion on the rear side is pushed by the glass rod pressing device, the glass on the front end side is consumed, so as to be successively moved forward and melted. It is thus possible to continuously form the glass.

Since only the front end portion of the glass rod may be heated at a high temperature by the heating means, the glass forming apparatus has a simple structure, and only the front end portion of the heating cylinder may need be made heat resistant, thereby decreasing the cost.

In addition, since the molten glass does not slide on a metal or ceramic, the life of the heating cylinder is increased. The glass is filled in the forming mold immediately after melting, thereby reducing contamination and heterogeneity.

BRIEF DESCRIPTION OF THE DRAWINGS

The structure and characteristics of a glass forming apparatus and method of the present invention are made apparent by referring to the attached drawings.

DESCRIPTION OF PREFERRED EMBODIMENTS

Embodiments of the present invention are described in detail below with reference to the drawings.

Figure 1:
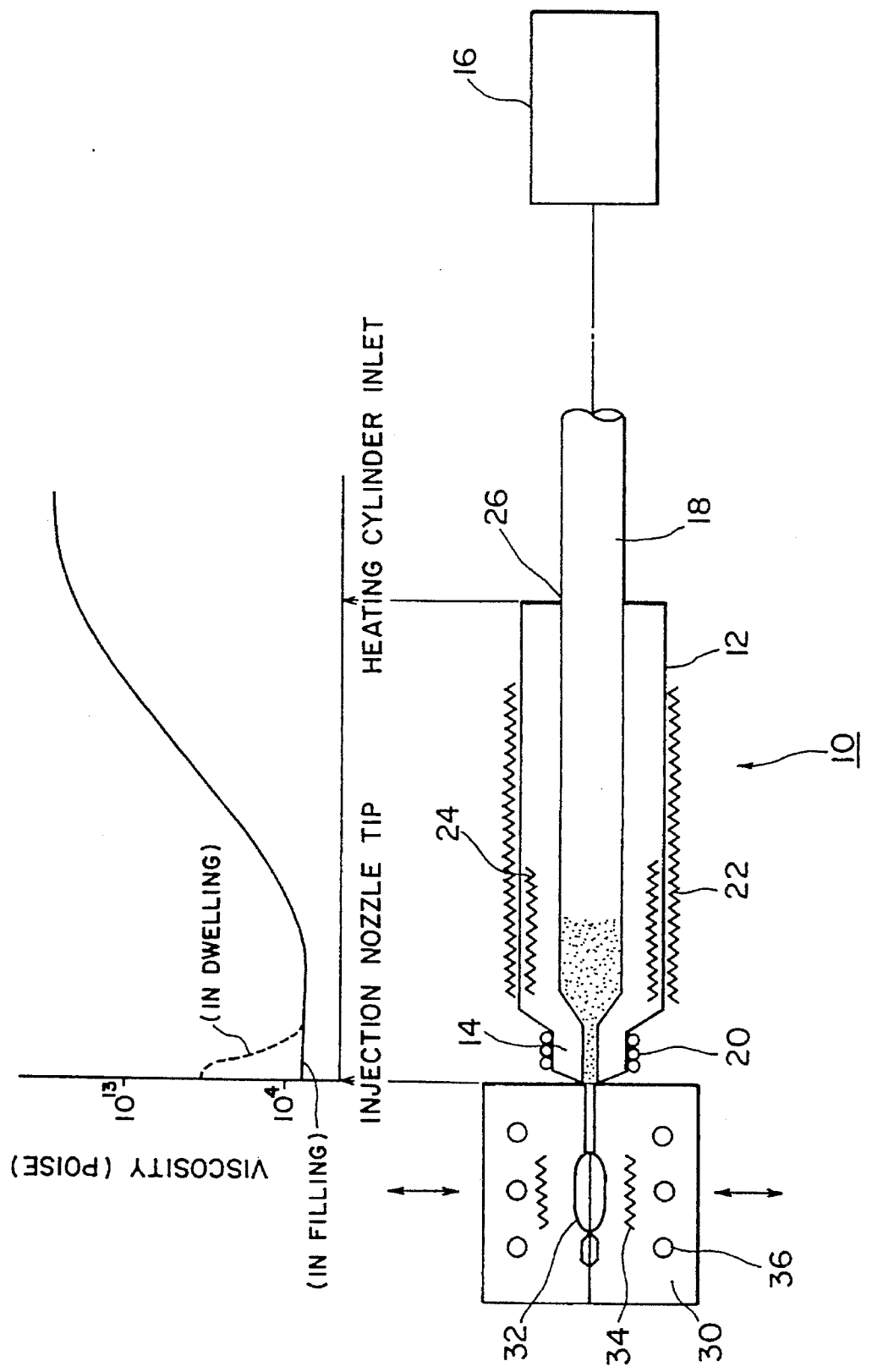
FIG. 1 is a conceptual drawing of a glass forming apparatus and method of the present invention.

FIG. 1 is a conceptual drawing of a glass forming apparatus and method of the present invention.

In the drawing, reference numeral 10 denotes a melting and injection portion comprising a heating cylinder 12 and an injection nozzle 14 provided at the front end of the heating cylinder 12. The melting and injection portion 10 is connected to a glass rod pressing device 16 so that a glass rod 18 is inserted into the heating cylinder 12 and pressed by the glass rod pressing device 16. The glass rod 18 is made of glass and is melted and consumed in itself, as well as forming a self-consumable plunger for pressing molten glass. In the present invention, the glass used includes glass and a glass matrix composite. Any one of hydraulic, pneumatic, electric, electromagnetic and mechanical driving devices may be used as the glass rod pressing device 16.

Glass generally shows viscosity changes within a wide range of several poise to $10^{18}$ poise as temperature changes. A heater 20 is thus disposed over the whole peripheral region of the injection nozzle 14, and a heater 22 is disposed over the whole peripheral region of the heating cylinder 12. A heater 24 is also disposed in a portion of the heating cylinder 12 near the injection nozzle 14. These heaters are operated and controlled so as to form a suitable temperature gradient in the region from the portion near the injection nozzle 14 to the inlet 26 of the heating cylinder 12. It is thus possible to establish the state where the tip portion (near the injection nozzle 14) of the glass rod 18 has low viscosity, and the portion near the heating cylinder inlet 26 has high viscosity. In this case, the heaters are set so that the viscosity of the glass in the tip portion is $10^5$ poise or less (preferably $10^2$ to $10^4$ poise), and the viscosity of the glass near the heating cylinder inlet 26 is $10^{13}$ poise or more. The glass rod 18 is heated into the heating cylinder 12 and pressed.

The glass heated and softened in the heating cylinder 12 by the heaters 22 and 24 is further heated in the injection nozzle 14 by the heater 20. The glass is pressed and injected from the injection nozzle 14 by the force of the glass rod pressing device 16 to press the glass rod 18, and is filled in a cavity 32 of a forming mold 30. Since the portion near the injection nozzle 14 is easily cooled and the glass in the injection nozzle 14 is easily solidified, the glass is thus further heated by the heater 20 in order to prevent the clogging of the injection nozzle Although the forming mold 30 used is provided with the cavity 32 and can be divided into two parts, a forming mold which can be divided into many parts may be used.

The nozzle opening of the injection nozzle 14 can also be opened and closed by turning the heater 20 on and off. Namely, when the heater is turned on, the glass in the injection nozzle 14 is melted and is filled in molten condition in the cavity 32 of the forming mold 30, and the molded product can be held under pressure. After dwelling is completed, when the heater 20 is turned off, the glass in the injection nozzle 14 is solidified. Even if the injection nozzle 14 is separated from the forming mold 30 in the next cooling step or discharge step, it is thus possible to prevent the glass from drooling from the nozzle opening of the injection nozzle 14.

In order to improve the molten condition of the glass filled in the cavity 32, a heater 34 is buried in the forming mold 30, and mold temperature control medium holes 36 are provided in the forming mold, and a temperature control medium is supplied to the forming mold temperature control medium holes 36.

Since the glass rod 18 is continuously pushed by the glass rod pressing device 16 after filling the glass in the cavity 32 of the forming mold 30, the molded product is held under pressure, thereby preventing the occurrence of shrink marks during cooling.

In the present invention, the viscosity of the glass in the portion near the injection nozzle 14 is $10^5$ poise or less, and the viscosity in the vicinity of the heating cylinder inlet 26 is $10^{13}$ poise or more. This is because the work point which enables the forming of glass is about $10^4$ poise, and because glass with a viscosity of $10^{13}$ poise or more assumes the state where it has sufficient rigidity and is not plastically deformed. The viscosity is not always limited to the above values so long as the above-described function is satisfied.

When the glass rod 18 is consumed and becomes short, a new glass rod 18 having the same dimensions may be added to the rear end of the short glass rod 18, whereby glass can be continuously supplied. In this case, both glass rods 18 can be fused to each other if required.

The glass rod 18 is preferably a round rod from the viewpoint of the structure of the forming apparatus.

Although the heaters 20, 22, 24 are disposed in the heating cylinder 12 and the injection nozzle 14 so that the glass rod 18 is heated and melted by the heaters 20, 22, 24, the heating method is not limited to electric heating by the heaters 20, 22, 24, and another heating method such as high-frequency heating, microwave heating, plasma heating or the like can be employed. A temperature control mechanism (a cooling system) can also be provided on the heating cylinder 12 for forming an optimum temperature distribution in the glass rod 18 if required.

The steps of the glass forming method of the present invention are described below.

The glass rod 18 made of the glass used as a molding material is first inserted into the heating cylinder 12. A temperature gradient is formed by driving the heaters 20, 22, 24 so that the viscosity of glass in the vicinity of the injection nozzle 14 is a value of $10^5$ poise or less, which allows forming, and the viscosity of glass in the vicinity of the heating cylinder inlet 26 is a value of $10^{13}$ poise or more, which produces no plastic deformation of glass.

In the state wherein the tip of the injection nozzle 14 closely contacts to the forming mold 30, the glass rod 18 is then forwardly moved by pressure by the glass rod pressing device 16. The molten glass in the heating cylinder 12 is thus pressed and filled in the cavity 32.

In order to prevent the occurrence of a shrink mark in the molded product, the glass rod 18 is continuously pressed for an appropriate time, and thus the glass filled in the cavity 32 is held under pressure.

After dwelling is completed, the molded product is cooled in the forming mold 30 and is then removed by the ejector after opening the mold.

Annealing can also be made if required. When annealing must be made for a long time in the state wherein the molded product is placed in the forming mold 30, multiple forming molds 30 may be prepared and successively used.

After cooling (annealing), the injection nozzle 14 which closely contacts to the forming mold 30 is separated therefrom. At this time, the tip of the injection nozzle 14 must be sealed. The heater 24 disposed in the heating cylinder 12 is thus turned off so that the glass in the injection nozzle 14 is solidified, thereby preventing drooling of the glass from the nozzle opening of the injection nozzle 14.

On the other hand, when the molten glass is supplied under pressure, the glass is filled in the cavity 32 through the gate of the forming mold 30. However, since the gate has a small size, the glass is first solidified in the gate due to precedence of cooling. Although it is thus necessary to supply the glass at a sufficiently high temperature to prevent the coagulation in the gate, the viscosity decreases with an increase in the temperature, and drooling of the glass from the nozzle opening occurs when the forming mold 30 is separated from the injection nozzle 14.

A description will now be made of a glass forming apparatus which is capable of freely setting the viscosity of glass and which prevents the occurrence of drooling of glass from the nozzle opening of the injection nozzle 14 after injection.

Figure 2:
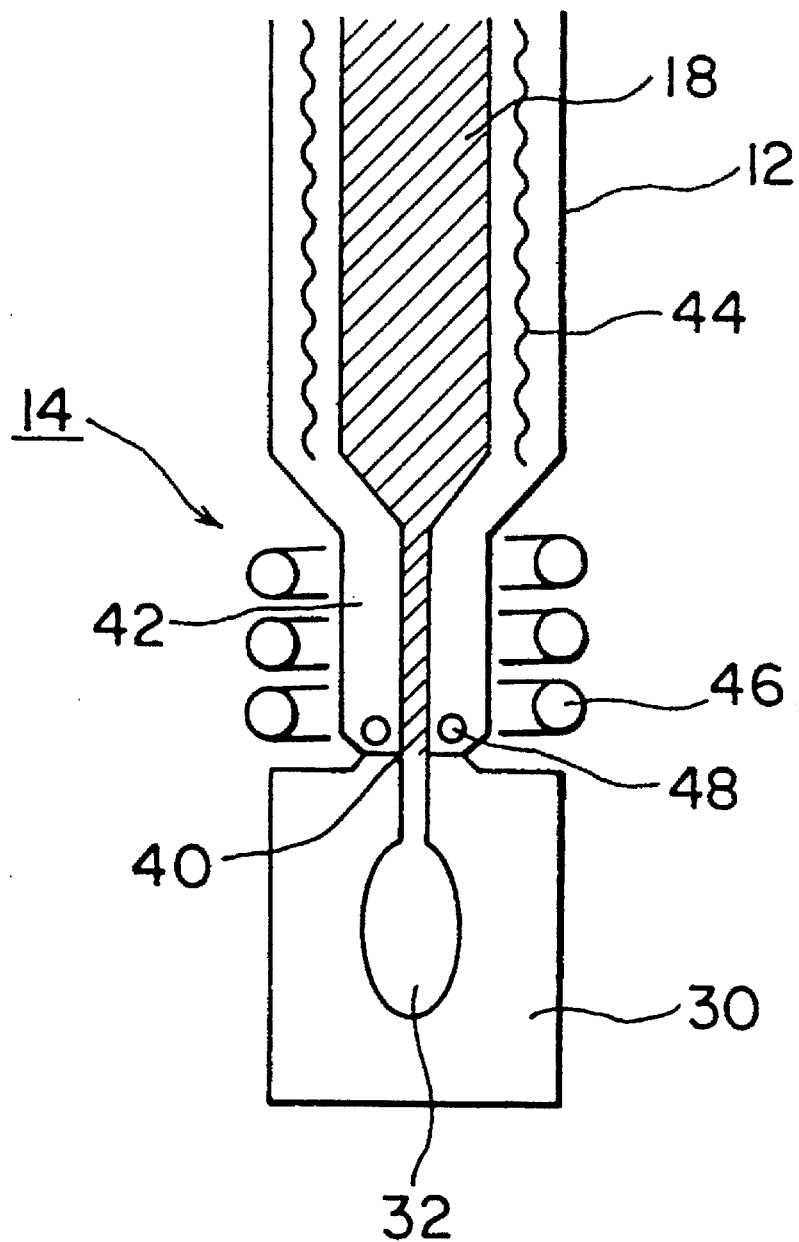
FIG. 2 is an enlarged drawing of an injection nozzle in a glass forming apparatus of the present invention.

FIG. 2 is an enlarged view of the injection nozzle of the glass forming apparatus of the present invention.

In the drawing, reference numeral 12 denotes a heating cylinder; reference numeral 14, an injection nozzle; reference numeral 40, the nozzle opening of the injection nozzle 14; and reference numeral 42, a nozzle body. A heater 44 is buried in the heating cylinder 12, and a heater 46 is disposed around the nozzle body 42 in close proximity to it.

Reference numeral 30 denotes a forming mold, the nozzle opening 40 being in close contact with the forming mold Reference numeral 48 denotes a cooler or a temperature control device which is buried in the nozzle body 42 so as to surround the nozzle opening 40. A controller 50 selectively operates the cooler 48 and heaters 44 and 46.

In the injection nozzle 14 configured as described above, when the glass is filled in the cavity 32 of the forming mold 30, the glass is heated by the heater 46 so that the viscosity is sufficiently decreased. After the glass is filled in the cavity 32 of the forming mold 30 and sufficiently held under pressure, the heating of the injection nozzle 14 is stopped by turning the heater 46 of the injection nozzle 14 off, and the injection nozzle 14 is cooled by the temperature control device 48 so that the viscosity of the glass in the injection nozzle 14 is increased.

After the cooling by the temperature control device 48 is completed, and after the viscosity of the glass in the injection nozzle 14 is a value suitable for cutting, the forming mold 30 is transversely moved, whereby the glass can be directly cut by shearing force. Alternatively, after the forming mold 30 is downwardly moved, the glass can be cut by moving scissors (not shown).

In other words, the viscosity of the glass is sufficiently lowered by the heater 46 until the glass is filled in the cavity 32 of the forming mold 30 so that the sufficient amount of glass is diffused over the whole cavity 32. After the fill of the glass is completed, the viscosity of the glass is subsequently increased by cooling by the temperature control device 48, whereby the glass can easily be cut. During molding and cutting of the glass, any desired value of the viscosity of the glass can be selected, and the times of supply and stop can be arbitrarily controlled. It is also possible to prevent drooling of the glass from the nozzle opening 40 of the injection nozzle 14 and the occurrence of defects in the cut position of the glass.

The heater 46 is capable of rapid heating by high-frequency induction heating. The injection nozzle 14 is thus made of a conductive material such as a metal or the like, and the heater 46 comprises a coil and is disposed around the nozzle body 42 in close proximity to it. When the injection nozzle 14 is made of an non-conductive material such as ceramics or the like, microwave heating is used. A usual hot-wire heater may be employed.

The temperature control device 48 is preferably capable of rapid cooling. The temperature control device 48 is thus formed at the tip of the nozzle body 42 so as to surround the nozzle opening 40, whereby a temperature control medium (for example, gas such as argon, nitrogen or the like or a liquid such as cooling oil or the like) can be supplied. Another cooling method may be employed in which a temperature control medium such as gas or the like is directly sprayed on the nozzle body 42 from the outside or a lump of a metal such as copper or the like is put into contact with the nozzle body 42 instead of the formation of the temperature control device 48. When the viscosity of the glass can be sufficiently increased by cooling by spontaneous heat radiation after the heating of the injection nozzle 14 is stopped, the temperature control device 48 need not be provided.

The operation of the injection nozzle 14 configured as described above is described below.

The glass rod 18 is first supplied under pressure and is heated by the heater 44, and the molten glass is supplied to the injection nozzle 14. After the forming mold 30 is placed an appropriate position of the injection nozzle 14 so as to closely contacts to the nozzle 14, the injection nozzle 14 is rapidly heated by operating the heater 46 so that the glass is heated until it has desired viscosity.

The glass is then supplied into the cavity 32 of the forming mold 30 by the glass rod pressing device 16 (FIG. 1) for pressing the glass rod. After the passage of the optimum supply time which is determined by the relation between the amount of the glass supplied and the amount of the glass filled in the cavity 32 of the forming mold 30 the heating of the injection nozzle 14 is immediately stopped and cooling by the temperature control device 48 is started.

After the viscosity of the glass in the vicinity of the nozzle opening 40 of the injection nozzle 14 is a value suitable for cutting, the glass is cut by moving the forming mold 30, and a next forming mold 30 is placed. The forming mold 30 filled with glass is annealed according to demand, and the molded product is then taken out. The forming mold 30 may be previously heated to a necessary temperature.

Since the nozzle body 42 is put into close contact with the forming mold 30, glass can be supplied not only downwardly but also transversely or upwardly.

A description will now be made of a glass forming method which does not produce defects such as breaking, bubbles or the like.

Figure 3:
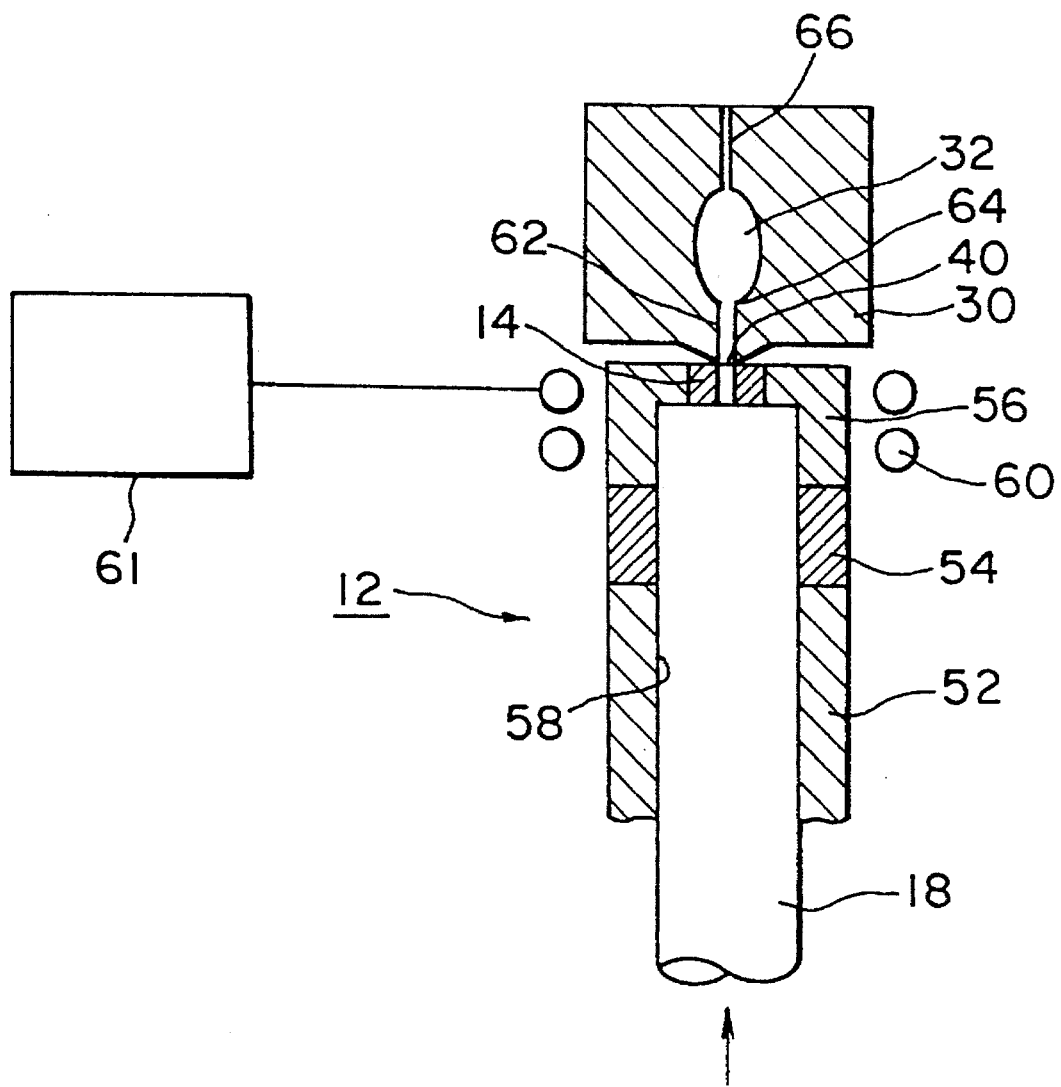
FIG. 3 is a sectional view of a forming apparatus in which glass is upwardly filled.

FIG. 3 is a sectional view of a forming apparatus in which glass is upwardly filled.

In the drawing, reference numeral 18 denotes a glass rod, and reference numeral 12 denotes a heating cylinder containing the glass rod 18. The heating cylinder 12 comprises a low-temperature side cylinder portion 52, a heat insulating cylinder portion 54 made of a material such as ceramics or the like which has high heat insulation, and a high-temperature cylinder portion 56 made of a heat resistant metal or conductive ceramics. These portions are continuously formed from the lower side to the upper side. In this way, the heat insulating cylinder portion 54 is provided in the heating cylinder 12, thereby preventing the heat in the high-temperature cylinder portion 56 from being transmitted to the low-temperature cylinder portion 52, and forming a great temperature gradient in the axial direction of the glass rod 18. This permits efficient pressure and injection of the glass rod 18.

Reference numeral 14 denotes an injection nozzle formed at the tip of the high-temperature cylinder portion 56 and made of a heat resistant metal or a conductive ceramics. The glass is injected through the injection nozzle 14.

The glass rod 18 is pressed by the glass rod pressing device (FIG. 1) and is upwardly moved in a plunger room 58 formed by the heating cylinder 12. The glass rod pressing device 16 is controlled by a controller (not shown) so as to upwardly move the glass rod 18 at a set speed.

Reference numeral 60 denotes a high-frequency induction heating coil which is disposed around the high-temperature cylinder portion 56 in close proximity to it. The high-frequency induction heating coil 60 generates a high-frequency induced current in the high-temperature cylinder portion 56 by the driving current received from a high-frequency source device 61 so that the high-temperature cylinder portion 56 is heated by high-frequency induction heating. In this case, the high-frequency source device 61 receives a signal from a controller so as to supply a set driving current to the high-frequency induction heating coil 60. Since the high-frequency induction heating coil 60 heats only the vicinity of the injection nozzle 14, the portion of the glass rod 18 which is surrounded by the high-temperature cylinder portion 56 is rapidly melted.

The glass rod 18 is then upwardly moved by the glass rod pressing device 16 so as to press the molten glass at the tip thereof. The pressed glass is thus injected from the injection nozzle 14. When the driving current is continuously supplied to the high-frequency induction heating coil 60, the unmelted portion of the glass rod 18 is continuously melted.

Reference numeral 30 denotes a forming mold made of a heat resistant metal or ceramics and having a fixed side and a movable side which are put into contact with and separated from each other at a parting line by a forming mold opening/closing device (not shown). The forming mold 30 has a runner 62 which is opened at a position corresponding to the injection nozzle 14 and a cavity 32 communicating with the runner 62. Namely, the gate 64 disposed between the runner 62 and the cavity 32 is located at the lower side of the cavity 32. A vent 66 which communicates with the outside of the forming mold 30 is formed at the upper end of the cavity 32 in order to exhaust the air in the cavity 32 through the vent 66 when the glass is filled in the cavity 32.

The glass is thus upwardly made to flow in the runner 62 in the forming mold 30 and then the flow front of the glass is moved into the cavity 32 through the gate 64. Even after the glass enters the cavity 32, the glass is constantly upwardly moved so that the space of the cavity 32 is filled with the glass.

Hence the glass is gradually upwardly moved in the cavity 32 thereby preventing the occurrence of defects such as breaking, bubbles or the like in the molded product.

In addition, the viscosity of glass in the portion near the inlet of the cavity 32, for example, in the gate 64, is $10^2$ to $10^5$ poise, and the supply speed of glass is as low as about 10 (cm/sec), preferably about 0.1 to 1 (cm/sec), whereby the quality of the molded product can be improved.

The controller controls the high-frequency source device 61 so as to supply the set driving current to the high-frequency induction heating coil 60. The glass in the high-temperature cylinder portion 56 is heated to the set temperature on the basis of the conditions such as the glass composition, the structure and temperature of the forming mold 30 and so on so that the viscosity of the glass in the gate 64 is within the above range. The controller also controls the glass pressing device 16 so as to upwardly move the glass rod 18 at the set speed. At this time, the glass supply speed in the gate 64 is set to be within the above range.

Since the glass in the tip portion melted in the nozzle opening 40 in an initial stage has nonuniform viscosity, and since defects easily occur in the portion, the portion is discharged to a slug reservoir (not shown) and is not supplied to the cavity 32 during filling.

Although, in FIG. 3, the injection nozzle 14 is opened to the upper side, even if the injection nozzle 14 is opened to the lower side, the glass can be upwardly filled in the cavity 32 of the forming mold 30 by providing a U-shaped runner 62 in the forming mold 30. In this way, the opening direction of the injection nozzle 14 is not particularly limited.

A description will now be made of a glass forming apparatus in which can prevents the deformation of an intermediate portion of the glass rod.

Figure 4:
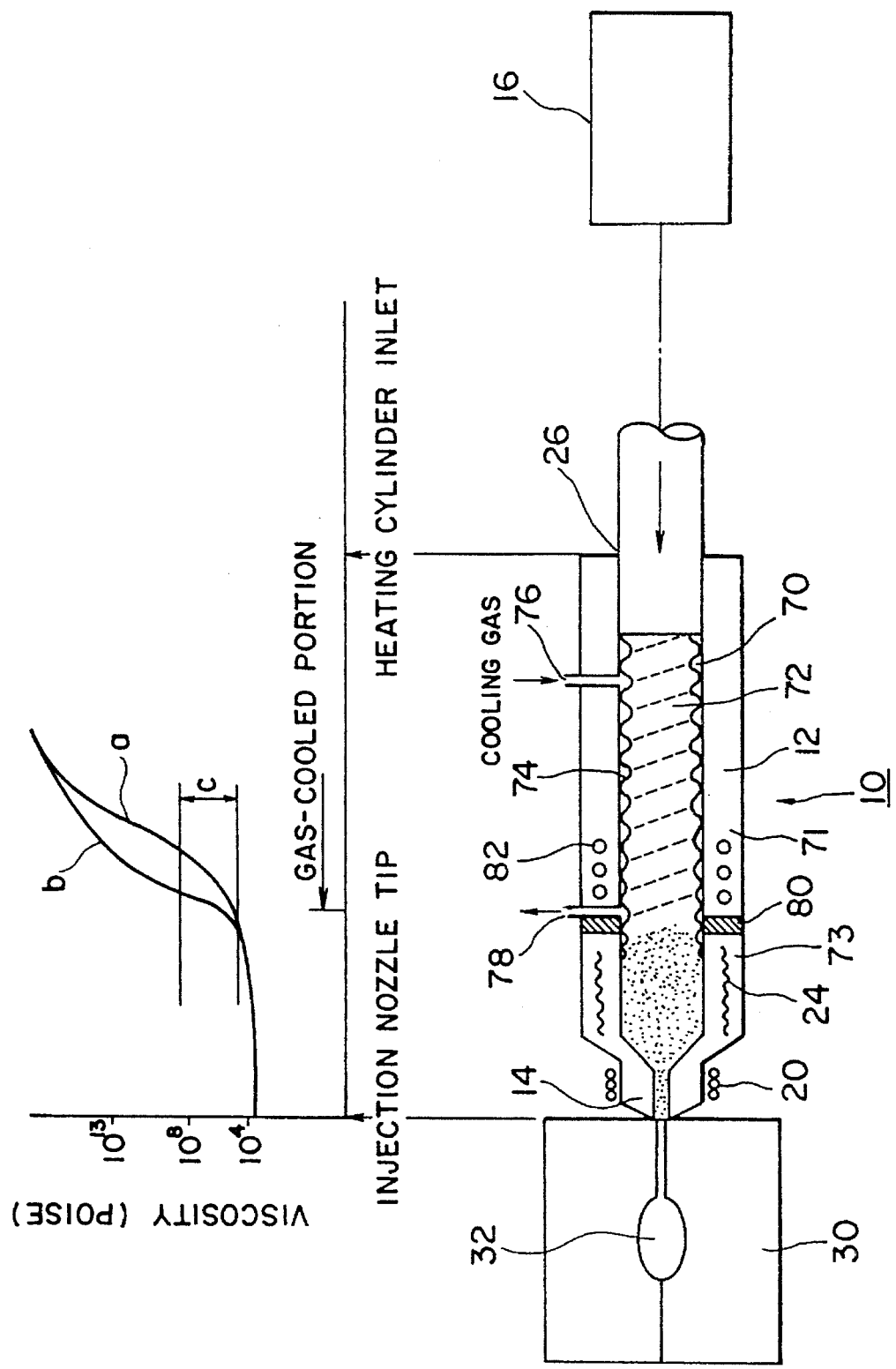
FIG. 4 is a conceptual drawing of a glass forming apparatus of the present invention in which grooves are axially formed in a glass rod for preventing the deformation of the glass rod.

FIG. 4 is a conceptual drawing of a glass forming apparatus in which a groove is formed in the glass rod in the axial direction thereof so as to prevent the deformation of the glass rod.

In the drawing, reference numeral 10 denotes a melting injection portion comprising a heating cylinder 12 and an injection nozzle 14 provided at the tip of the heating cylinder 12, a plunger room 70 being formed in the heating cylinder 12. The melting injection portion 10 is connected to a glass rod pressing device 16 which functions to insert a glass rod 72 in the plunger room 70 and press it.

It is necessary that the tip portion of the glass rod 72 is melted, and the root portion thereof near the heating cylinder inlet 26 is maintained in a solid state in order to press the molten glass. When the glass rod 72 is pressed in this state, the glass rod is radially deformed in a semi-fluid region or a viscoelastic region which forms an intermediate portion of the glass rod 72. This causes the occurrence of galling between the glass and the inner wall of the heating cylinder 12 and thus makes it impossible to fill the glass in the cavity 32 under appropriate pressure. In order to prevent the phenomenon, it is necessary that the temperature region which produces galling of the heating cylinder 12, which is caused by unsound deformation of the glass rod 72, is decreased as much as possible by increasing the axial temperature gradient of the glass rod 72.

A heat insulating layer 80 is thus interposed between the high-temperature cylinder portion 73 provided with the heaters 20, 24 and the low-temperature cylinder portion 71 on the rear end side in the heating cylinder 12 so that the axial temperature gradient of the glass rod 72 is increased by increasing the axial temperature gradient of the heating cylinder 12 as much as possible. A cooling pipe 82 may be also disposed in the low-temperature cylinder portion 71 of the heating cylinder 12 near the heat insulating layer 80 so as to further cool the glass rod 72 with the cooling medium supplied to the cooling channel 82.

Although the above method has remarkable effects, a groove 74 in one of various shapes is formed in the surface of the glass rod 72 in order to further prevent the deformation of the glass rod 72 and achieve the sound supply of glass. The formation of the groove 74 in the surface of the glass rod 72 permits the groove 74 to absorb the radial deformation of an intermediate portion of the glass rod 72, thereby preventing the occurrence of galling.

The dimensions of the groove 74, such as the width, the depth and the like thereof, are not limited, and the shape of the groove 74 is appropriately determined in accordance with the composition, viscosity, melting temperature of glass, the pressure applied, the temperature gradient of the glass rod 72 and so on.

Cooling gas is caused to flow from the root portion of the glass rod 72 to the tip thereof so as to force the intermediate portion of the glass rod 72 to cool.

A cooling gas inlet 76 and a cooling gas outlet 78 both of which are passed through the heating cylinder 12 and opened to the plunger room 70 are thus provided. The cooling gas inlet 76 and the cooling gas outlet 78 are formed so as to open at positions corresponding to the root portion and an intermediate portion, respectively, of the glass rod 72. Cooling gas is supplied from the cooling gas inlet 76, sent to the cooling gas outlet 78 through the groove 74 and is discharged to the outside from the cooling gas outlet 78. During this time, the cooling gas cools the glass rod 72, thereby suppressing deformation of the intermediate portion.

Although the cooling gas is preferably discharged from a position close to the heat insulating layer 80, the discharge position is not limited to this, and the cooling gas may be caused to flow from a position near the root portion to a position near a deformation portion.

Inert gas such as Ar gas or the like is generally preferable as the cooling gas, and conditions such as the flow rate and the like are determined by forming conditions (particularly, the melting temperature, the viscosity of glass and the like).

In this way, the occurrence of galling on the inner wall of the heating cylinder 12 can be further suppressed by forcing the glass in the intermediate portion of the glass rod 72 to cool with the cooling gas. Namely, in FIG. 4, character a shows the viscosity distribution of the glass rod 72 when the glass was not cooled, and character b shows the viscosity distribution of the glass rod 72 when the glass was cooled. Character c shows a viscosity region (about $10^5$ to $10^9$ poise) in which glass is easily deformed, and galling easily occurs because of the large friction with the inner wall of the heating cylinder 12.

As shown in FIG. 4, since the viscosity distribution is changed from a to b by cooling glass, the portion corresponding to the viscosity region c is decreased by cooling glass.

As a result, the glass in the intermediate portion of the glass rod 72 is not easily deformed, and the absorption of deformation by the groove 74 prevents the occurrence of galling.

The cooling gas may be caused to flow from the tip of the glass rod 72 to the root portion thereof.

Figure 5:
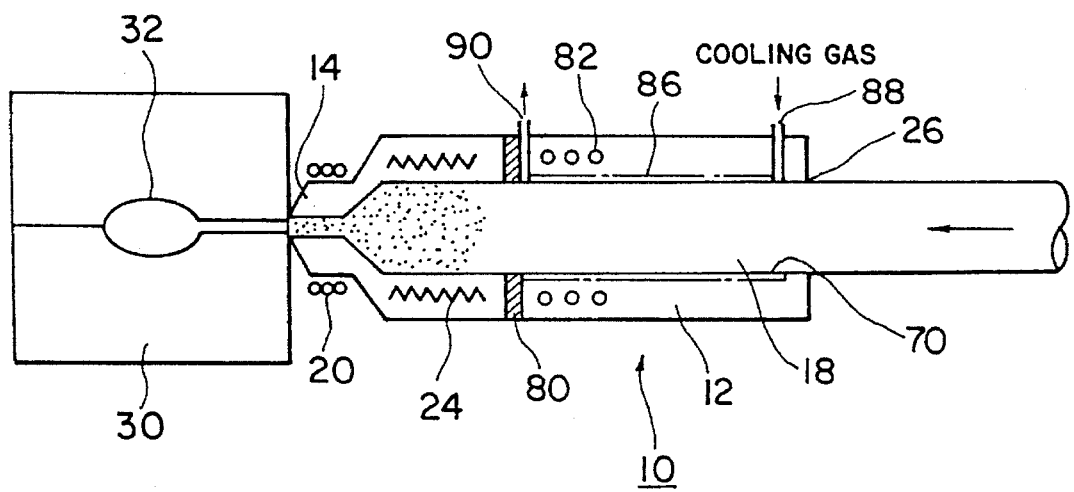
FIG. 5 is another conceptual drawing of glass forming apparatus of the present invention in which grooves are formed in a cylinder for preventing the deformation of the glass rod.

FIG. 5 is a conceptual drawing of another glass forming apparatus of the present invention which is capable of preventing deformation of a glass rod.

In this case, a groove 86 opened to a plunger room 70 is formed within the region from an inlet 26 of a heating cylinder 12 to an intermediate portion thereof in the inner wall of the heating cylinder 12 so that a portion of a glass rod 18 within the region is forced to cool by the cooling gas flowing through the groove 86. A large temperature distribution is consequently formed in the axial direction of the heating cylinder 12.

A cooling gas inlet 88 and a cooling gas outlet 90 both of which are passed through the heating cylinder 12 and communicate with the groove 86 are thus provided. The cooling gas inlet 88 and the cooling gas outlet 90 are formed so as to open at positions corresponding to the heating cylinder inlet 26 and an intermediate portion, respectively, of the cylinder cylinder 12. Cooling gas is supplied to the cooling gas inlet 88, sent to the cooling gas outlet 90 through the groove 86 and is discharged to the outside from the cooling gas outlet 90. During this time, the cooling gas cools the glass rod 18 and suppresses deformation of the intermediate portion thereof. Even if the cooling gas is sent in the reverse direction, the same effect can be obtained. The direction of the groove 86 is not limited to the axial direction of the heating cylinder 12, and the heating cylinder 12 may be formed in the peripheral direction thereof and may have any desired shape.

The present invention is not limited to the above embodiments, various changes can be made on the basis of the gist of the present invention within the range of the invention.

What we claimed is:

1. A glass forming apparatus comprising:

(a) a cylinder comprising a high-temperature first section for holding glass melt and an low-temperature second section defining a piston cylinder, said cylinder having an opening at a first end for receiving, into said second section, a solid glass rod to serve as a piston in cooperation with said cylinder;

(b) an injection nozzle mounted at a second end of said cylinder opposite said first end;

(c) first heating means, coextensive with said first section, for continuously maintaining a temperature gradient in the glass along the length of said cylinder with the lowest temperature of the gradient being below the melting point of the glass rod and the highest temperature of the gradient being above the melting point of the glass rod, to continuously heat said glass rod only within said first section of said cylinder to convert said solid glass rod to glass melt at a point within said first section;

(d) second heating means for intermittently heating the glass melt within said injection nozzle;

(e) a forming mold disposed opposite said injection nozzle for receiving glass melt ejected from said injection nozzle; and (f) glass rod pressing means for engaging an end of the glass rod exterior to said cylinder to drive the solid glass rod through said opening and into said second section, thereby forcing glass melt through said injection nozzle when said forming mold is in contact with said injection nozzle.

2. A glass forming apparatus according to claim 1, further comprising gas supply means for supplying cooling gas to a groove provided on the glass rod so as to cool the glass rod.

3. A glass forming apparatus according to claim 1, further comprising a groove formed in an interior surface of said second section and gas supply means for supplying cooling gas to said groove so as to cool the glass rod.

4. A glass forming apparatus in accordance with claim 1 wherein said second heating means is a high-frequency induction heater comprising a coil arranged around said injection nozzle.

5. A glass forming apparatus in accordance with claim 4 wherein said first heating means is a high-frequency induction heater comprising a coil arranged around said first section.

6. A glass forming apparatus in accordance with claim 1 wherein said first heating means is a high-frequency induction heater comprising a coil arranged around said first section.

7. A glass forming apparatus in accordance with claim 1 wherein said glass rod pressing means is arranged coaxial with the heating cylinder for pressing the rod axially.

8. A glass forming apparatus in accordance with claim 1 wherein said cylinder further comprises a heat insulating section joining said second section to said first section and serving to inhibit transmission of heat from said first section to said second section.

9. The glass forming apparatus of claim 8 further comprising cooling duct in said second section and means for circulating a cooling medium through said cooling duct.

10. A glass forming apparatus in accordance with claim 1 further comprising means for intermittently stopping flow of said glass melt through said injection nozzle.

11. A glass forming apparatus in accordance with claim 10 wherein said means for intermittently stopping flow is a device for intermittently cooling said injection nozzle to stop the flow of glass melt through said injection nozzle.

* * * * *

UNITED STATES PATENT AND TRADEMARK OFFICE
CERTIFICATE OF CORRECTION

PATENT NO.  : 5,540,746
DATED       : July 30, 1996
INVENTOR(S) : SASAKI et al

It is certified that error appears in the above-indentified patent and that said Letters Patent is hereby corrected as shown below:

Col. 3, line 65, begin a new paragraph with "In".
Col. 4, line 12, after "nozzle" insert --14.--.
Col. 5, line 57, after "mold" insert --30.--.
  Col. 6, line 28, delete "of-a" insert --of a--; and
       line 66, delete "stopped" insert --stopped,--.
  Col. 8, line 16, after "32" insert a comma --,--; and
       line 48, delete "in"

Signed and Sealed this

Twenty-ninth Day of April, 1997

BRUCE LEHMAN

*Attest:*

*Attesting Officer*  Commissioner of Patents and Trademarks